United States Patent
Butler et al.

[15] 3,700,247
[45] Oct. 24, 1972

[54] FLUSH COOLING OF SHAFT SEALING SCREW MEANS

[72] Inventors: Robert G. Butler, Dayton, Ohio; Don E. Carter, Creve Coeur, Mo.; George A. Latinen, deceased, late of Springfield, Mass. by May V. Latinen, administratrix

[73] Assignee: Monsanto Company, St. Louis, Mo.

[22] Filed: Aug. 16, 1971

[21] Appl. No.: 172,106

[52] U.S. Cl..............277/28, 259/191, 259/DIG. 16, 277/67, 277/134
[51] Int. Cl............................F16j 15/40, F16j 15/54
[58] Field of Search........277/64, 67, 134, 28, 58, 71, 277/72; 259/191, DIG. 16

[56] References Cited

UNITED STATES PATENTS

| | | | |
|---|---|---|---|
| 3,364,523 | 1/1968 | Schippers | 277/134 X |
| 3,246,901 | 4/1966 | Wickli | 277/28 X |
| 1,558,630 | 10/1925 | Reed | 277/28 X |
| 1,163,045 | 12/1915 | Symons | 277/134 X |

*Primary Examiner*—Samuel B. Rothberg
*Attorney*—John W. Klooster et al.

[57] ABSTRACT

In certain shaft seals using a viscoseal-type sealing screw such as those adjacent the pressurized screw pump section of a viscous liquid devolatilizer, excessive heat buildup and/or prolonged elevated temperature exposure in the seal region can either deteriorate the liquid materials in the sealing screw or render such liquids less viscous to an extent such that the seal is no longer fully operative. To cool and flush the sealing screw and the liquid materials therein, a fluid conduit bringing fresh liquid material continuously to the sealing screw from the adjacent pressurized section is provided.

6 Claims, 7 Drawing Figures

INVENTORS
ROBERT G. BUTLER,
DON E. CARTER,
GEORGE E. LATINEN

BY *John W. Klooster*
ATTORNEY

FLUSH COOLING OF SHAFT SEALING SCREW MEANS

BACKGROUND

Viscoseal-type sealing screw assemblies are sometimes employed in such apparatus as extruders and wiped film devolatilizers to provide a seal for viscous fluids in the region between a rotating shaft and a housing wall adjacent a zone of relatively high viscous fluid pressure. A viscoseal-type sealing screw assembly can be regarded as a single screw pump of the type which operates by making use of the viscosity of the fluid being pumped.

Thus, in a conventional viscoseal-type sealing screw assembly, within a hub region defined in a housing adjacent a pressurized fluid filled zone where a revolving shaft extends axially therethrough, reverse screw threads are located. The threads are located either on the hub or on the shaft. The threads extend circumferentially about the shaft and the hub. When the shaft rotates at a predetermined speed, and fluid from the pressurized zone is pushed against the threads, a seal is formed between the hub and the shaft by the fluid and the threads.

Grooves between thread ribs fill with fluid and bridge a small gap between hub and shaft. Because the fluid in a groove has substantial viscosity, it tends to be dragged along by the revolving shaft in a circumferential direction. Such fluid movement, however, is stopped by a screw thread whose land area acts as a barrier to such fluid flow. At such barrier, the force exerted on such fluid may be resolved into a component perpendicular to the walls of the groove formed by the thread and a component parallel to the direction of the groove formed by adjacent threads. Since the groove is open at the end, the tendency of the latter force is to cause movement of the fluid along the groove. In a conventional viscoseal-type sealing screw, the groove fills until the force parallel to the direction of the groove equals the pressure force at the end of the groove.

Such a conventional viscoseal-type sealing screw assembly thus operating necessarily dissipates mechanical energy, and converts much of this mechanical energy into heat, because the fluid between the moving shaft and the stationary hub or housing is in viscous shear. This heat must necessarily be transferred from the active length of the seal by some means.

When the viscosity of a fluid is low, for example, when the fluid is water, lubricating oil, gasoline, or the like, the active length of a viscoseal-type seal tends to be long, and the generation of heat per unit length, small. In such a case, the heat may generally be removed without excessive temperature buildup in the fluid used for sealing through the use of such means as a cooling fluid jacket on the housing (or barrel), radiation, transfer of heat along the shaft and/or housing, or the like.

However, when the viscosity of the fluid is high, for example, when the fluid is a melted polymer, or the like, the active length of a viscoseal-type seal tends to be short, and the generation of heat per unit length tends to be very high. In this case, it may not be possible conveniently to remove heat from the active length rapidly enough by external cooling means to prevent excessively high temperatures from building up in the active length of the seal. Such temperature buildup can cause the fluid in the seal to degrade and decompose, or it can cause the viscosity of the fluid to decrease to the point where it is ineffective in producing sealing action in the seal. The product fluid adjacent to the seal may become contaminated with undesirable degradation products. Thus, conventional viscoseal-type sealing screw assemblies are limited in usefulness and in application.

There has now been discovered a technique whereby one can use a reverse screw viscoseal-type sealing screw assembly in seals for viscous fluids which may be heat sensitive, thereby extending the usefulness of such a sealing screw assembly. The technique involves the flushing and cooling of such an assembly by using the viscous fluid itself. Thus, a stream of fresh viscous fluid, taken for example from an adjacent zone wherein such fluid is pressurized, is continuously fed to the low pressure end of a viscoseal-type sealing screw assembly and is pumped by the seal itself back into the adjacent zone of pressurized fluid at the high temperature, high pressure end of the seal. The heat generated in the seal appears as increased sensible heat in the stream of fluid circulated through the seal. The rate of fluid circulation through the seal is chosen so that the rise in temperature of the fluid in the seal is small enough so that the fluid will not be heated enough to degrade it or to impair its sealing effectiveness (by reducing its viscosity). The technique can be practiced automatically.

SUMMARY

The present invention is directed to a flush cooling assembly for use with a viscoseal-type sealing screw means where a shaft rotates in a pressurized fluid medium. The assembly utilizes a fluid tight, elongated housing having defined therein at adjacent adjoining regions, generally along a common axis extending therethrough, certain chambers, including a cylindrical sealing chamber and a pressurizable fluid chamber.

Extending between the chambers is a rotatable shaft. Associated with the shaft is sealing screw means in the sealing chamber. Such screw means has circumferentially located, radially projecting, helically extending rib portions adapted to urge fluid into said fluid chamber away from the sealing chamber, thereby to form between the shaft and the adjacent sealing chamber walls a seal during shaft rotations with pressurized fluid in the fluid chamber.

Conduit means interconnects the fluid chamber with the sealing chamber, and such pipe means is adapted to convey fluid from the fluid chamber into the sealing chamber when the fluid chamber is pressurized with fluid and the shaft rotates.

DRAWINGS

The present invention is better understood by reference to the attached drawings wherein.

DETAILED DESCRIPTION

Figure 1:
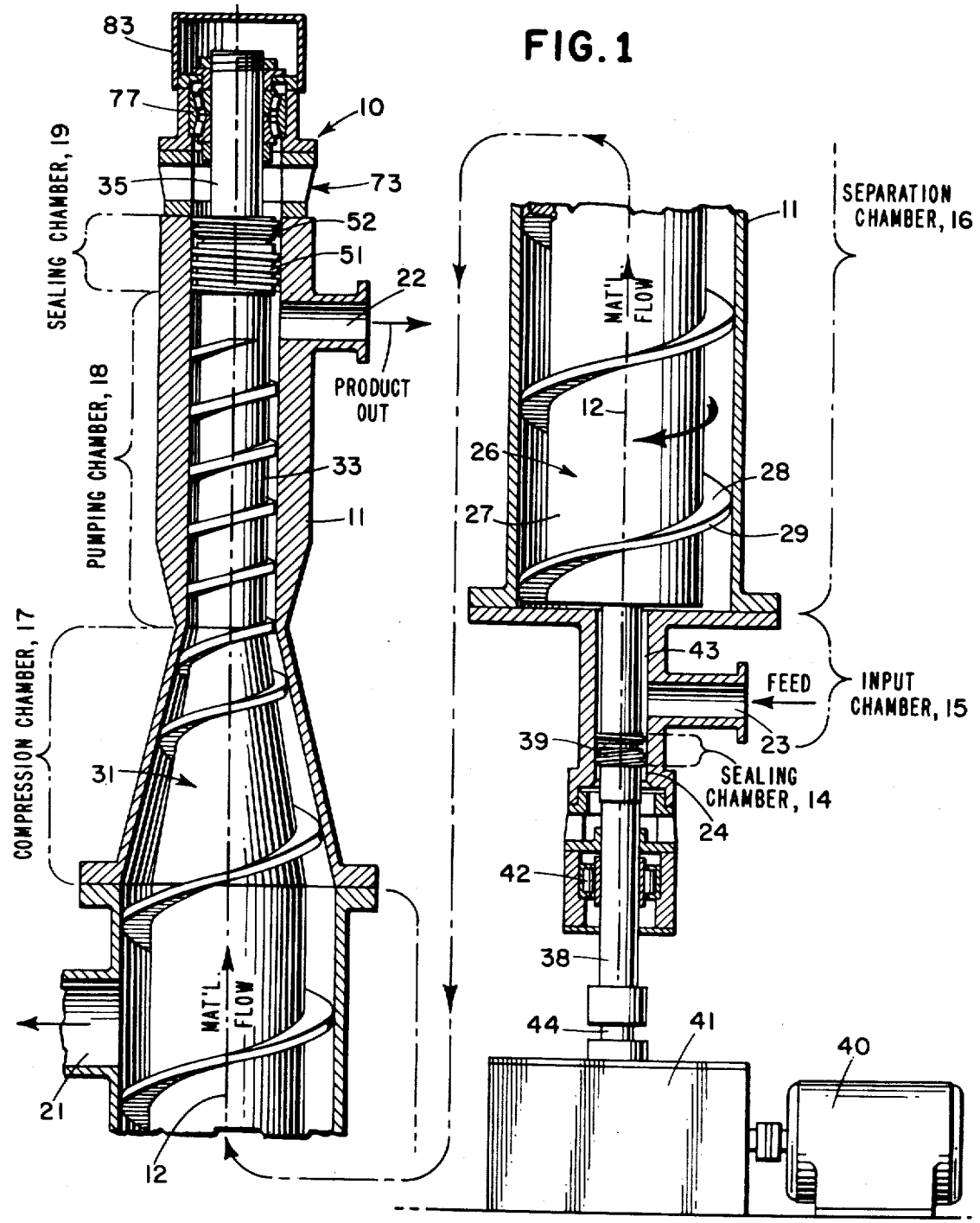
FIG. 1 is a diagrammatic representation of a wiped film devolatilizer suitable for utilizing therein a flush cooling assembly of the present invention.

Turning to FIG. 1, there is seen a wiped film devolatilizer, herein designated in its entirety by the numeral 10. The devolatilizer 10 has a housing 11 which has therewithin at successive adjoining regions along a common axis 12 extending therethrough various chambers, as follows: a first or lower melt sealing chamber 14; a melt input chamber 15; an enlarged, elongated, cylindrical vapor separation chamber 16; a melt transition or melt compression chamber 17; a melt pumping chamber 18; and a second upper melt sealing chamber 19.

Housing 11 has defined therein various ports, as follows: a vapor take-off port 21 in a separation chamber 16; a melt output port 22 in the melt pumping chamber 18 adjacent the melt sealing chamber 19; a melt input port 23 in the input chamber 15; and a drive shaft entry port 24 into melt sealing chamber 14 located coaxially on axis 12. Those skilled in the art will appreciate that, alternatively, a drive shaft entry port (not shown) could enter melt sealing chamber 19, as when a devolatilizer is top driven.

A rotor assembly, herein designated in its entirety by the numeral 26, is positioned generally within, and generally coaxial with, the separation chamber 16. Rotor assembly 26 has an elongated shaft means 27 axially located in separation chamber 16 with screw ribs 28 extending radially outwardly therefrom and terminating in land regions 29 at the circumferentially extending radial outer edges thereof.

The land regions 29 are adapted to sweep by interior walls of housing 11 in separation chamber 16 during each revolution of shaft means 27. Rotor assembly 26 is adapted during operation of devolatilizer 10 to move melt (not shown) from input chamber 15 to transition chamber (or compression chamber) 17 while concurrently spreading at least a portion of such melt over the interior walls of the housing 11 in separation chamber 16 as a thin film (not shown). Simultaneously with such movement and such spreading, the rotor assembly 23 is adapted to permit vapors escaping from such melt to move to the vapor take-off port 21. In place of screw ribs 28, one may employ a plurality of individual flattened blade members (not shown).

A compression screw means, herein designated in its entirety by the numeral 31, is generally positioned within, and generally coaxial with, the compression chamber 17. Compression screw means 31 is adapted to collect, compress and convey melt from the separation chamber 16 to the pumping chamber 18 during operation of the devolatilizer 10.

Screw pump means, herein designated in its entirety by the numeral 33, is generally positioned within, and generally coaxial with, the pumping chamber 18. The extruder screw means 33 is adapted to compress, convey, and pressurize melt from the compression chamber 17 to the melt output port 22.

A shaft 35 is positioned within, and generally coaxial with, the second sealing chamber 19. Sealing means, here viscoseal-type reverse screws 51, 52 on shaft 35, block passage of melt from pumping chamber 18 therethrough along shaft 35.

A shaft 38 is positioned within, and generally coaxial with, both first melt sealing chamber 14 and melt input chamber 15. A viscoseal-type reverse screw means 39 on shaft 38 is adapted to block passage of melt from input chamber 15 therethrough along shaft 38 for purposes of the present invention.

Observe that each of reverse screws 51, 52 and reverse screw 39 have circumferentially located, radially projecting, spirally extending rib portions arranged so that, when melt under pressure is forced into the grooves between such respective rib portions of such screws, the melt is urged in an axial direction away from the respective shaft ends and towards the pressurizing fluid in, respectively, melt input chamber 15 and melt pumping chamber 18. Fluid or melt is forced into tight engagement between housing 11 walls and respective shafts 35 and 38 in the region of these screws, thereby to produce the seals desired in each respective sealing chamber 14 and 19 during operation of devolatilizer 10.

Shaft 38, in cooperation with housing 11 in the region of input chamber 15, defines an annular space 43 between the shaft 38 and the housing 11 along an axially extending distance from first sealing chamber 14 to separation chamber 16. A roller bearing 42 supports the lower end of shaft 38.

Shaft 38 is integral with rotor assembly 26; rotor assembly 26 with compression screw means 31; compression screw means 31 with extruder screw means 33; and extruder screw means 33 with shaft 35; thereby adapting shaft 38, rotor assembly 26, compression screw means 31, extruder screw means 33, and primary shaft portion 35 for common rotational movements on a common axis.

Drive shaft 44 is coupled to shaft 38 and is driven by motor-transmission assembly 40, 41.

Figure 2:
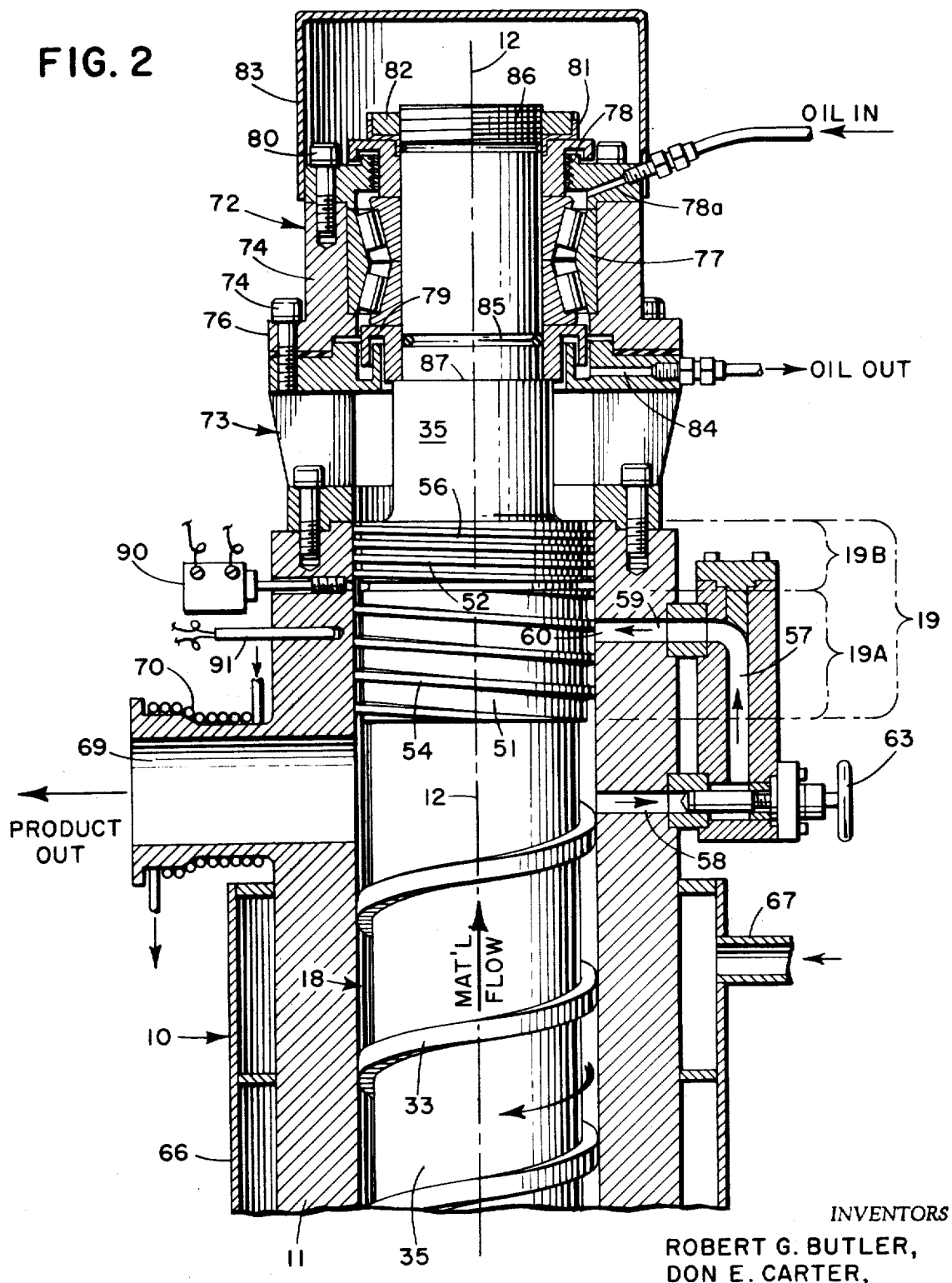
FIG. 2 is an enlarged detailed vertical sectional view of the output portion of a devolatilizer similar to that shown in FIG. 1 but equipped with an embodiment of a flush cooling assembly of this invention.
Figure 3:
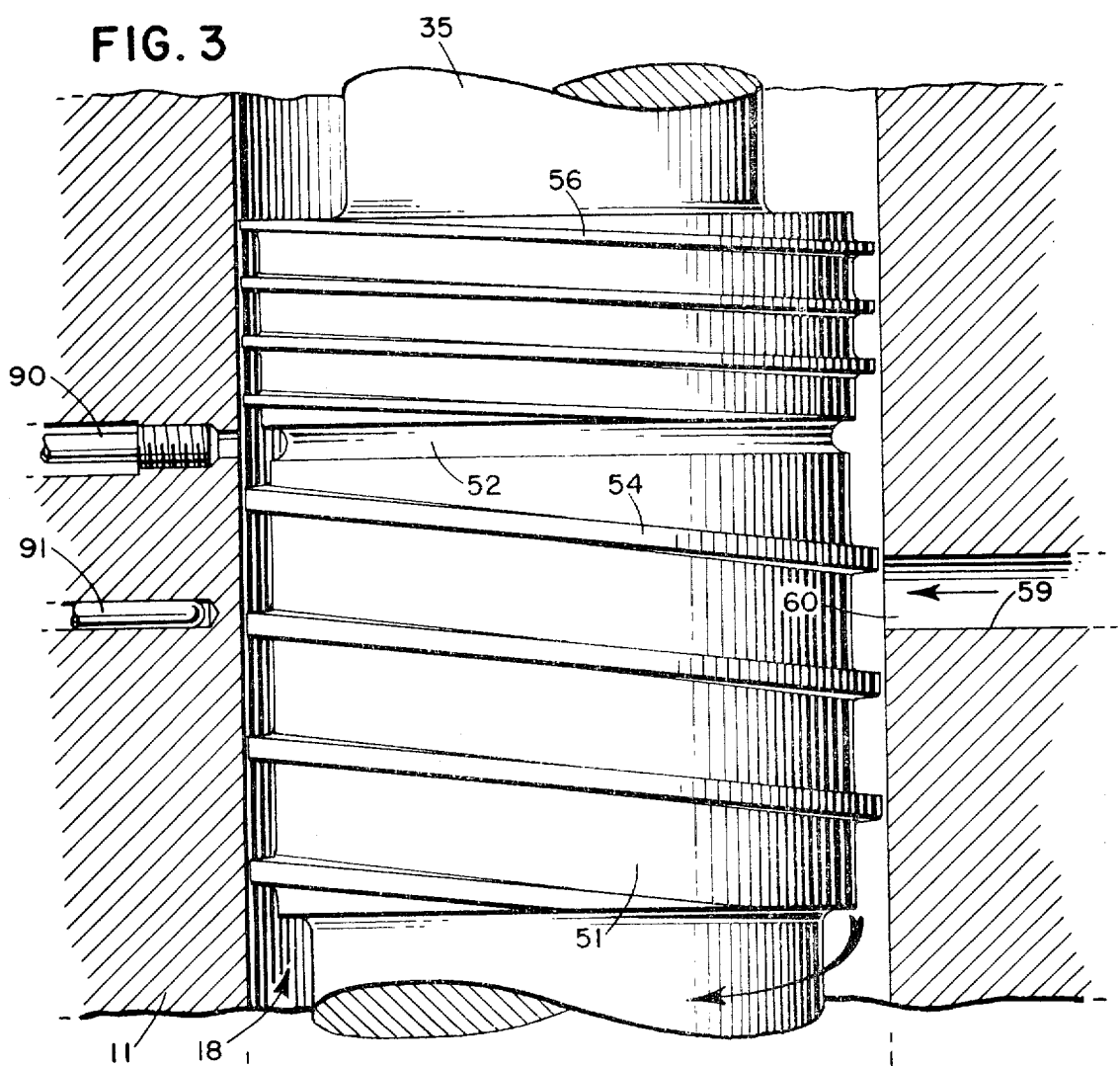
FIG. 3 is an enlarged vertical sectional view of the sealing screw arrangement shown in FIG. 2.

Referring to FIG. 2, there is seen an enlarged, detailed, vertical sectional view of the output portion of a devolatilizer 10 of the type shown in FIG. 1. This apparatus employs a fluid tight, elongated housing 11 having defined therein at adjacent, adjoining regions generally along a common axis 12 extending therethrough a sealing chamber 19 and a pressurizable fluid chamber 18 (which is actually the pumping chamber of devolatilizer 10). The sealing chamber comprises a primary chamber (19A and a secondary chamber 19B. A rotatable shaft 35 which is coaxial with axis 12 extends through the sealing chamber 19 and pumping chamber 18. A viscoseal-type sealing screw 54 is located in the primary sealing chamber 19A circumferentially about shaft 35. The threads of the screw 54 are arranged in a reverse direction relative to the direction of rotation of shaft 35 whereby viscoseal screw 54 is adapted to make a seal between housing 11 and shaft 35 in primary sealing chamber 19A when shaft 35 rotates at a predetermined speed and the chamber 18 is pressurized with fluid to a predetermined extent. Those skilled in the art will appreciate that the viscoseal screw could, alternatively, be fixed to the adjacent walls of housing 11 in chamber 19A. Interconnecting the pressurizable fluid chamber 18 with the sealing chamber 19 is a conduit 58, 57, 50 which is adapted to convey pressurized fluid from chamber 18 to chamber 19. The discharge orifice 60 of such conduit is positioned in the sealing chamber so as to be opposite the ribs of the viscoseal-type sealing screw 54, discharge orifice 60 being preferably located somewhat rearwardly as shown in FIG. 2 relative to the chamber 19A.

In the embodiment shown, the portion 57 of conduit 58, 57, 59 is connected to radially extending holes 58 and 59 drilled or bored in housing 11 and which holes act as the outlet and inlet portions of the conduit 58, 57, 59 as shown. Valve 63 regulates the rate of fluid flow through conduit 58, 57, 59. When devolatilizer 10 is operating normally, chamber 18 is pressurized with fluid which is sealed off and prevented from transversing sealing chamber 19 by means of the screw 54. However, because of the heat buildup in chamber 19A that would occur during normal devolatilizer 10 operation and because, as discussed earlier, such heat buildup would adversely affect fluid in chamber 19A, fluid (not shown) in chamber 18 is allowed to pass through conduit 58, 57, 59 to what is, in effect, the rear region of screw 54. This fluid which flows through the conduit 58, 57, 59 into the sealing chamber 19A because of the circumferential portion of orifice 60 is moved or pumped by threads 54 axially back into the chamber 18 so that a flushing action in chamber 19A occurs. This flushing action not only prevents overheating in chamber 19A, but also prevents overheating of fluid.

In the operation of devolatilizer 10, in order to maintain fluid material in the chamber 18 at a predetermined temperature (characteristically an elevated one in devolatilizer 10 operation), housing 11 is equipped with a jacket assembly designated in its entirety by the numeral 66 through which a heated fluid, such as hot oil, or the like (not shown), is circulated during operation of devolatilizer 10, such fluid being fed into jacket assembly 66 through an inlet nozzle 67, and being taken therefrom through an outlet nozzle (not shown). Similarly, to prevent heat loss at fluid product output nozzle 69, nozzle 69 is wound with a coil 70 adapted to conduct heated fluid.

Because in the operation of devolatilizer 10 there is a possibility that the rate of fluid egress from orifice 60 will be such as to be in excess of that which screw 54 will pump back into chamber 18, there is the possibility of an "overflow" situation occurring where in fluid will ooze or flow out the rear (relative to chamber 18) of chamber 19A between shaft 35 and housing 11. To prevent escape of fluid so leaving chamber 19A, a viscoseal-type sealing screw 56 is located in chamber 19B in the embodiment shown though a conventional type of seal, such as a packing gland (not shown) could be used, if desired, as those skilled in the art will readily appreciate. Use of a seal here is entirely optional. Screw 56 is used in the presently preferred embodiment shown of the present invention and has reverse threads (relative to the direction of shaft 35 rotation) which, when shaft 35 rotates and fluid is in the region 52, operates to create a seal between shaft 35 and housing 11 similar to the manner in which the screw 54 functions.

A bearing assembly, herein designated in its entirety by the numeral 72, journals shaft 35 for rotational movements. Bearing assembly 72 is isolated from the main body of housing 11 (and from sealing chamber 19) by a spacer ring 73 secured to the top end of housing 11 and to which the housing 74 of bearing assembly 72 is secured by means of mounting bolts 75 which threadably engage spacer ring 73 after passing through a flange 76 on housing 74. Housing 74 encloses thrust bearing 77 which supports shaft 35. Bearing 77 is enclosed top and bottom by oil baffles 78 and 79. Baffle 78 is secured on housing 74 by screws 80. A lock washer 81 and lock nut 82 on threaded end 86 of shaft 35 secure bearing 77 against shoulder 87 of shaft 135. An end cap 83 is secured over the exposed end of shaft 53 to housing 74. To lubricate and cool bearing assembly 72, oil is injected into bearing 77 through orifice 78, circulated, allowed to run downwards over the bearing and removed through orifice 84. An O-ring seal 85 in a mating groove on shaft 35 provides an oil seal at the lower end of bearing 77.

Screw 54 is designed to produce an axial drop in pressure along its axial length such that at least all of the pressure in chamber 18 is absorbed thereby and screw 56 is designed to produce an axial drop in pressure along its axial length such that all of the fluid reaching chamber 19B from chamber 19A is completely consumed by screw 56. Screw generally handles lower pressures than those handled by screw 54. Screw 54 is designed so that it will generate at all expected operating conditions of shaft rotational speed and fluid viscosity a pressure at least equal to the pressure difference between the interior and exterior of pressure chamber 18 (exterior pressure is typically atmospheric).

In designing a viscoseal screw, one selects a screw which will produce the desired pressure having regard to the existing condition of shaft speed, shaft diameter, fluid viscosity, and the limiting constructional dimensional tolerances. Calculation methods described by Schenkel [Schenkel, Gerhard, Plastics Extrusion Technology and Theory, London, Iliffe Books Ltd. (1966), page 98, et seq.] may be used to estimate the pressure developed by a given viscoseal screw. Thus, the total flow Q developed by a screw pump consists of three partial flows combined in the equation:

$$Q = Q_D - Q_P - Q_L$$

wherein $Q_D$ (the drag flow) is the axial flow from low to high pressure generated by the interaction of the screw with its housing;

$Q_P$ is the axial flow from high to low pressure along the grooves as a result of the pressure gradient along the groove; and $Q_L$ is the axial flow from high to low pressure over the screw lands as a result of pressure difference between adjacent grooves.

These three terms may be calculated from the following equations:

$$Q_D = \frac{\pi^2 d^2 h n \sin\phi \cos\phi}{2}$$

$$Q_P = \frac{\pi d h^3 \sin^2 \phi}{12\eta} \cdot \frac{p_2 - p_1}{l_2}$$

$$Q_L = \frac{\pi^2 d^2 \delta^3 \tan \phi}{12\eta' e} \cdot \frac{p_2 - p_1}{l_2}$$

wherein
  $d$ = screw diameter
  $h$ = groove depth
  $\phi$ = helix angle of thread
  $\tan \phi$ = (pitch of thread/d)
  $e$ = land width
  $\delta$ = radial clearance of lands
  $n$ = number of thread starts
  $\eta$ = fluid viscosity in grooves
  $\eta'$ = fluid viscosity over lands
  $L_2$ = effective axial length of screw
  $P_2$ = pressure at high pressure end of screw
  $p_1$ = pressure at low pressure end of screw In designing a viscoseal screw, various values of $d$, $h$, $\phi$, $e$, $\delta$, and n are assumed, and the length $L_2$ is calculated. When a combination which gives a reasonable length is found, that design is selected. In using the equations, the various terms may be expressed in any set of consistent engineering units.

In designing the length and diameter of the annulus, the well known equations for calculating the pressure dorp for liquid flowing through an annulus are employed. These equations are given by Schenkel on pages 114–115.

During operation of devolatilizer 10 with valve 63 opened so as to permit some flow of fluid from chamber 18 through conduit 58, 57, 59 into chamber 19A, it is desirable to have some means for determining whether the flow of fluid through conduit 58, 57, 59 into chamber 19A is such as to cause a pressure buildup in the rearward region of screw 54. To make such a determination, devolatilizer 10 is equipped with a pressure transducer 90, or equivalent pressure sensor device, mounted in housing 11. Should fluid reach the region of groove 52 between chambers 19A and 19B, the pressure in groove 52 rises and this increase in pressure is sensed by transducer 90. The valve 63, in the event of such a registered pressure increase, can then be adjusted to reduce the quantity of fluid exiting from orifice 60 into chamber 19.

In order to determine the temperature existing in chamber 19A during operation of devolatilizer 10, a thermocouple 91 or similar temperature sensor is mounted in housing 11. By monitoring the temperature recorded by sensor 91, an indication of the temperature in chamber 19A is gained. If the temperature is excessive, valve 63 can be opened, and vice versa.

Figure 7:
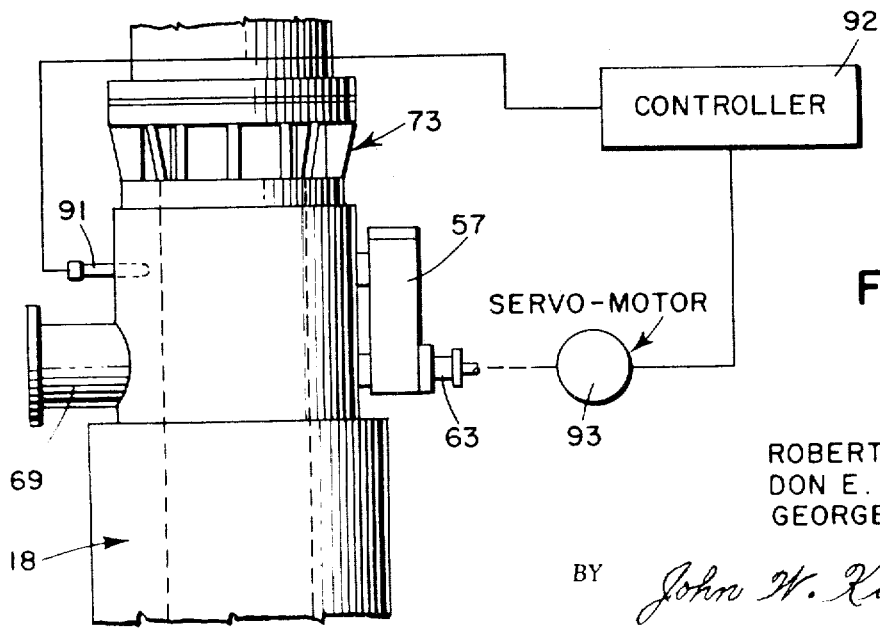
FIG. 7 is a schematic diagram of an automatic control system for adjusting the flow of melt in the embodiment of FIG. 2.

If desired, valve 63 can be operated automatically as by inserting a flow controller between transducer 90 and valve 63 or between thermocouple 91 and valve 63 or both, as desired. Thus, in FIG. 7 is a schematic diagram of one automatic control system for adjusting the flow of fluid through valve 63. The flow of fluid through valve 63 in general is chosen so that the temperature of the melt in chamber 19A is at some optimum temperature which depends on the properties of the particular fluid being devolatilized. The temperature of the melt in chamber 19A is sensed by thermocouple 91, and the electrical signal produced thereby is transmitted to a controller 92 which drives a servomotor to open or close the valve 63. Thus, the flow of melt through valve 63 is maintained at a level to regulate the temperature at the thermocouple 91 at the set point called for by controller 92.

It will be appreciated that the viscoseal-type sealing screw in sealing chamber 19 will not operate unless viscous fluid is present in them. When starting up the devolatilizer 10, it is generally desirable to maintain the pressure in the separation chamber 16 at about atmospheric pressure until melt has reached the region of sealing chamber 19. This is done by controlling the pressure applied to the vapor take-off port 21. As soon as melt has reached sealing chamber 19, this pressure at vapor take-off port 21 is adjusted to the desired level.

Figure 4:
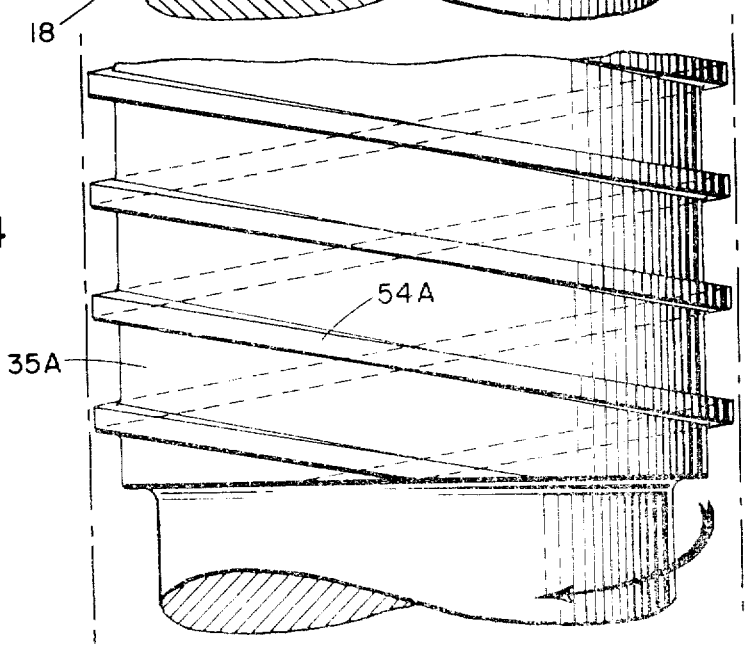
FIG. 4 shows an alternative embodiment of one of the two viscoseal-type sealing screws employed in the embodiment of FIGS. 1–3.

In FIG. 4 is shown an alternative embodiment for a viscoseal-type sealing screw 54, this alternative embodiment being herein designated in its entirety by the numeral 54A on a shaft 35A and being adaptable for use in sealing chamber 19A (see FIG. 2). Screw 54A has multiple threads (two starts and three turns) though more threads and/or turns may be used if desired. As is the case in the other figures herein, arrows indicate the direction of shaft rotation.

Figure 5:
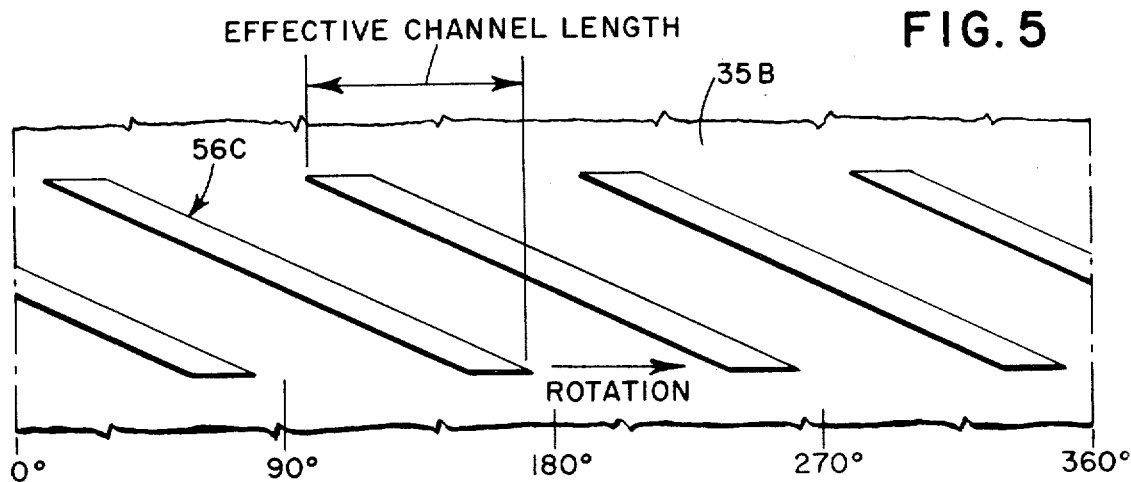
FIG. 5 shows an alternative arrangements of the other of the two viscoseal-type sealing screws arrangements shown in FIGS. 1–3.

In FIG. 5 is shown an alternative embodiment for a viscoseal-type sealing screw which is herein designated in its entirety by the numeral 56B on a shaft 35B and which is adaptable for use in sealing chamber 19A or 19B depending on use considerations (pressures, viscosity, temperatures, etc.). Here, the individual threads of screw 56B each do not circumferentially extend completely about shaft 35B, but rather, extend only a short distance helically about the shaft 35B. Effective channel length between circumferentially adjacent threads of screw 35B are labeled in FIG. 5.

Figure 6:
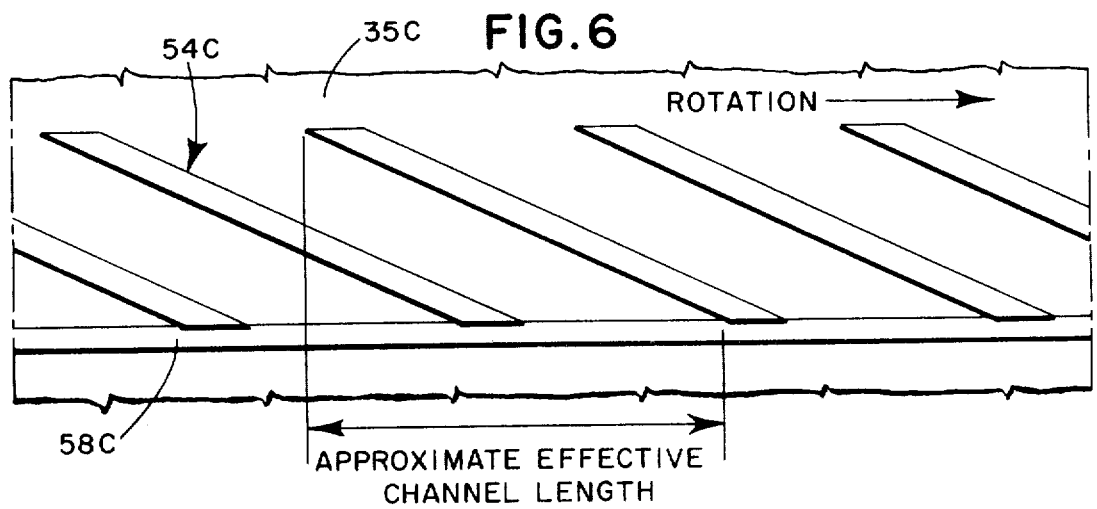
FIG. 6 shows an embodiment similar to that of FIG. 5 but with an integral circumferential end dam.

In FIG. 6 is shown a further alternative embodiment for a viscoseal-type sealing screw which is herein designated in its entirety by the numeral 54C on a shaft 35C. Screw 54C is similar to screw 56B, but is equipped with an integral dam 38C which effectively lengthens the useful channel length between circumferentially adjacent threads of screw 54C as labeled in FIG. 6. The radial height of dam 38C can vary up to the height of the threads of screw 54C as desired or chosen. The dam 38C should be located at the end of screw 54C farthest removed from pressure chamber 18 (see FIG. 2).

Typically, shaft speeds for an embodiment of this invention range from about 5 to 2,000 revolutions per minute, though faster and slower speeds may be employed as those skilled in the art will appreciate, depending on circumstances.

In the embodiments described above, the viscoseal screw threads are shown to be part of the rotating shaft and the housing enclosing them to be a smooth cylinder. It will be appreciated by those skilled in the art that the device will operate equally well if the threads are cut in the housing and the shaft surface is smooth. It will also be appreciated that the housing and threads need not necessarily be cylindrical. One can use any housing-thread configuration which has circular symmetry about the axis of the shaft, such as a frustum of a cone, is feasible and practical, and does not depart from the spirit and scope of the present invention.

For example, a devolatilizer with a sealing chamber similar to those shown in FIG. 2 was used to remove residual monomer from a polystyrene melt stream. The melt pumped from the devolatilizer was essentially pure polystyrene.

The sealing chamber had the following dimensions:

|  | First Sealing Chamber (51) | Second Sealing Chamber (52) |
|---|---|---|
| Screw diameter | 12.0 inches | 12.0 inches |
| Groove depth | 0.3 inch | 0.18 inch |
| Helix angle of thread | 2°40' | 3°38' |
| Land width | 1/4 inch | 7/64 inch |
| Radial clearance of land | 0.02 inch | 0.02 inch |
| Number of thread starts | 1 | 1 |
| Axial length of screw | 6-3/4 inches | 3-1/4 inches |

The shaft was operated at 85 rpm and the polystyrene melt was at 230° C. With the flow through valve 63 adjusted to 400 lb/hr. the seal maintained a discharge pressure of 1,200 psi at the product outlet without leaking.

It will be appreciated that while the embodiments of the present invention as shown and described therein are depicted in combination with a particular wiped film devolatilizer, the present invention can be utilized with any devolatilizer, extruder, or the like, to achieve flushing and cooling of a viscoseal-type reverse sealing screw assembly, and it will be further appreciated that many variations and modifications of the present invention are feasible and practical without departing from the spirit and scope of the invention disclosed and claimed herein.

What is claimed is:

1. Apparatus for flush cooling a shaft sealing assembly incorporating a viscoseal-type sealing screw means, said apparatus comprising:
   A. a fluid tight, generally elongated housing having defined therein at adjacent, adjoining regions generally along a common axis extending therethrough a radially symmetrical sealing chamber coaxial with said axis, and a pressurizable fluid chamber which is adapted to be normally pressurized to some predetermined relatively high fluid pressure with a fluid of predetermined relatively high viscosity,
   B. a rotatable shaft coaxial with said axis and extending through said sealing chambers and into said pressurizable fluid chamber,
   C. viscoseal-type sealing screw means in said sealing chamber circumferentially located either on said shaft or on the inner walls of said second sealing chamber and having radially projecting, helically extending rib portions adapted to form when said shaft rotates at a predetermined speed with pressurized fluid in said fluid chamber a seal between said housing and said shaft in cooperation with fluid from said pressurizable fluid chamber and urge said fluid from said sealing chamber into said fluid chamber, and
   D. conduit means interconnecting said pressurizable fluid chamber with said sealing chamber and adapted to convey said pressurized fluid from said pressurizable fluid chamber to said sealing chamber, the discharge orifice of said conduit means being positioned in said sealing chamber opposite said rib portions.

2. The apparatus of claim 1 wherein:
   A. a second radially symmetrical sealing chamber is located adjacent said radially symmetrical sealing chamber on the side thereof remote from said pressurizable fluid chamber,
   B. said shaft extending through said second sealing chamber, and
   C. sealing means in said second sealing chamber between said shaft and said housing and adapted to provide a seal therebetween.

3. The apparatus of claim 2 wherein said sealing means comprises a second viscoseal-type sealing screw means.

4. The apparatus of claim 1 including valve means functionally associated with said conduit means for regulating the flow of fluid therethrough.

5. The apparatus of claim 1 wherein a pressure sensor is located in the terminal region of said sealing chamber remotely relative to said pressurizable fluid chamber.

6. The apparatus of claim 1 further including:
   A. pressure sensing means located in the terminal region of said sealing chamber remotely relative to said pressurizable fluid chamber,
   B. valve means functionally associated with said conduit means for regulating the flow of fluid therethrough, and
   C. control means respective to said pressure sensor means adapted to control said variable valve means so that the quantity of fluid from said fluid chamber entering said sealing chamber is never sufficient to create a fluid back pressure in the region of said pressure sensor.

* * * * *